(No Model.)
M. W. MARSDEN.
LEAK PROTECTOR FOR VESSELS.
No. 534,611. Patented Feb. 19, 1895.
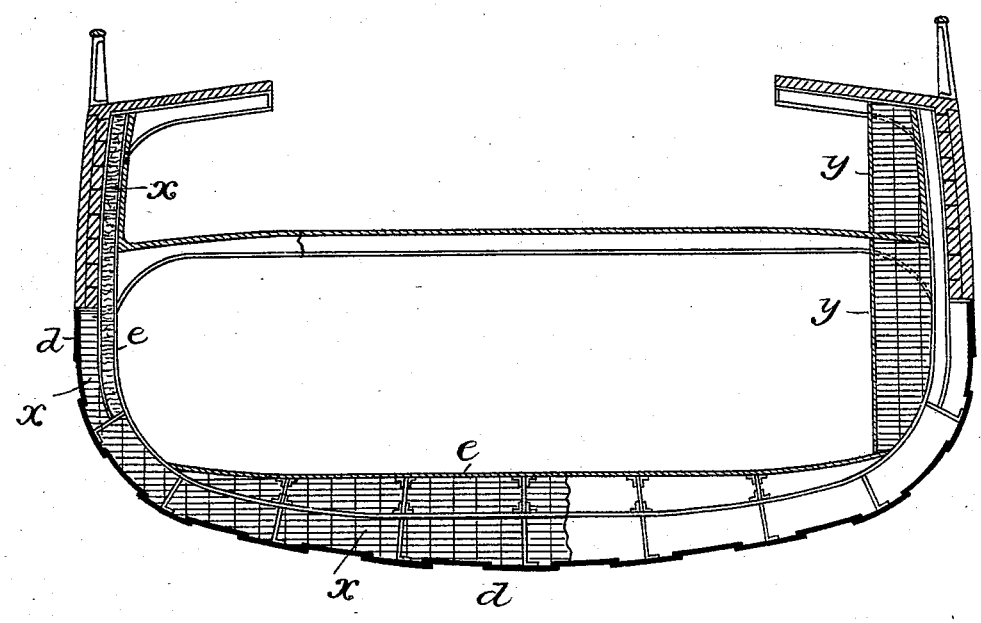
Witnesses
Inventor
Mark W. Marsden
Attorneys

UNITED STATES PATENT OFFICE.

MARK WORSNOP MARSDEN, OF PHILADELPHIA, PENNSYLVANIA.

LEAK-PROTECTOR FOR VESSELS.

SPECIFICATION forming part of Letters Patent No. 534,611, dated February 19, 1895.

Application filed November 22, 1894. Serial No. 529,644. (No model.)

*To all whom it may concern:*

Be it known that I, MARK WORSNOP MARSDEN, a citizen of the United States, residing at Philadelphia, in the county of Philadelphia and State of Pennsylvania, have invented certain new and useful Improvements in Protected Vessels or other Structures, of which the following is a specification.

The object of my invention is to protect vessels, forts or other structures from the injurious effects of the rupture of the shells or walls occasioned either by collision, projectiles or otherwise, and to this end my invention consists in combining with the compartments or spaces of such structures the pith or the pith and fibers of cornstalks as fully described hereinafter.

In the accompanying drawing, the figure is a transverse sectional elevation of a vessel illustrating the manner in which the same is protected by the use of the improved filling or packing material.

Efforts have been made from time to time during many years to provide some means of readily and effectually closing openings made in the hulls of vessels from collisions or projectiles. Different substances have been proposed, and some have been used, that have proved more or less serviceable, but none have fully secured all the results desired. Thus, for instance, it has been proposed to use masses of cork or other light material extending up to the water-line of the vessel, so that in the event of the space being pierced by shot, no more water can enter than will fill the space traversed by the shot, and thus the buoyancy of the vessel will be but slightly interfered with. Again, the amorphous cellulose of the cocoanut has been used with advantage as a barrier or cushion to protect vessels, forts and other structures.

After many experiments and tests with different materials, and with different methods of preparing different materials, I have discovered that a material can be prepared from corn-stalks (either Indian corn or maize or broom corn) which possesses in a high degree all the qualities desired. To this end I take corn-stalks and cut them into short lengths in some instances, or where large breakers are used the stalks are thrown into the same whole, and the fiber, pith and outside shell are all broken up together, and the comminuted pith is separated and used for the purposes of my invention. I have found by experiment that this substance has a most extraordinary capacity to absorb water or moisture, its capacity being over twenty times its own weight, which much exceeds the absorbtive capacity of any known substance capable of like uses, and further the rapidity which the water is absorbed by this substance is much greater than with any other substance. Thus, a compressed body of this material will absorb water to fully one half its capacity, or ten times its weight, almost instantly upon the water being brought into contact therewith. I have also found that after the substance has been saturated and then dried it recovers substantially its former condition and will act as before on again being wet. A great advantage of this material is that it can be secured in comparatively large grains or pieces thus avoiding the loss from dust in breaking up a material into fine particles. Other characteristics of this material are that it is inodorous, colorless, and incapable of making any stain, is absolutely inert and incapable of producing any injurious effect upon the health from its presence. It is light in weight, its specific gravity being very small, so little, that one third of the amount of maize pith is required to the amount demanded in the use of the lightest of any of the known packing materials. It is elastic and not liable to crumple in use.

The pith is used as a filler in different ways for different purposes. Thus as a protection for vessels or other structures as forts, &c., the material may be placed or packed in a space *x*, between the inner and outer shells *d*, *e*, of a vessel, or it may be placed in compartments *y*, at the sides and also transversely of the vessel and at other points.

The material is placed in the compartments and compressed therein, or is compressed into blocks of any desired size or density and then may be packed in suitable spaces or compartments. The compressed blocks or loose material may be packed in the compartments or spaces under hydraulic or other suitable pressure. When the shell of the vessel or of a compartment or structure containing the said material, is ruptured and water reaches the material, the latter will absorb the water with great rapidity and will rapidly swell and increase in bulk until it constitutes an effectual barrier to the further entrance of water into the space or compartment.

One of the great advantages of the above described material is the wide extent of territory in which it may be had, the readiness with which it may be had, and its comparatively insignificant cost, inasmuch as the stalk from which it is taken is practically in most instances a waste material. It is not necessary to use extreme care in most cases to separate the fiber and the pith as the presence of a small percentage of fiber is sometimes an advantage.

Unless prepared substantially as above described, corn-stalk pith has no quality in itself of advantage for use as a filler for vessels, as it would neither obstruct the passage of shot, nor fill the hole in the manner set forth upon the entrance of water. When, however, the corn-stalk pith is comminuted and the comminuted particles are compressed under heavy pressure in the compartment of the vessel, the mass of material has all the characteristics and advantages above set forth. Further, the comminuted particles do not break under compression in the compartment, but condense and flatten without producing dust, which has been an objection to the material heretofore used for this purpose.

Without limiting myself to the mode described of preparing the material, I claim as my invention—

1. As a protection for vessels or other structures, a filler composed essentially of compressed comminuted corn-stalk pith, substantially as described.

2. A vessel or other structure having a compartment provided with a filling composed of compressed comminuted corn-stalk pith confined in the compartment, substantially as described.

In testimony whereof I have signed my name to this specification in the presence of two subscribing witnesses.

MARK WORSNOP MARSDEN.

Witnesses:
A. N. DOBSON,
W. C. DUVALL.